Jan. 6, 1942.    H. A. BEEKHUIS, JR    2,269,000
PRODUCTION OF NITRATES FROM NITRIC ACID AND CHLORIDES
Filed Dec. 31, 1938
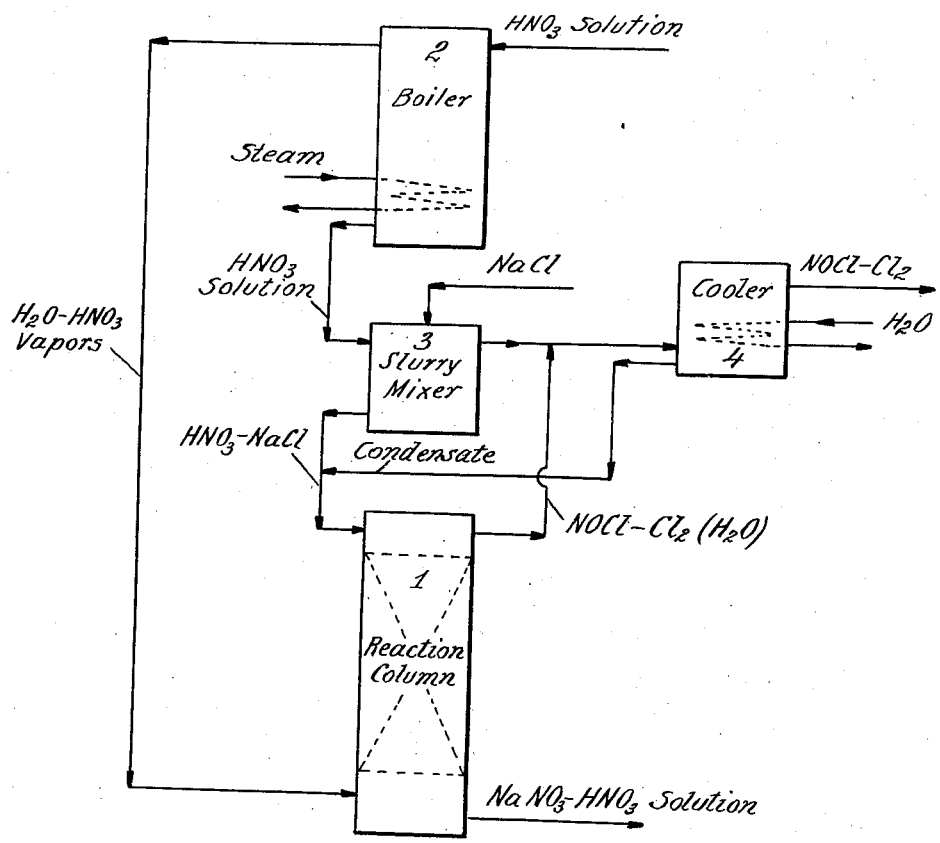
INVENTOR
Herman A. Beekhuis, Jr.
BY
Charles W. Brown
ATTORNEY // Patented Jan. 6, 1942

UNITED STATES PATENT OFFICE 2,269,000

PRODUCTION OF NITRATES FROM NITRIC ACID AND CHLORIDES

Herman A. Beekhuis, Jr., Petersburg, Va., assignor to The Solvay Process Company, New York, N. Y., a corporation of New York Application December 31, 1938, Serial No. 248,751

6 Claims. (Cl. 23—102)

This invention relates to a process for reacting nitric acid with a metal chloride to produce a nitrate and evolve the chlorine content of the chloride as a mixture of nitrosyl chloride and chlorine.

It is known that by heating a mixture of nitric acid and a metal chloride such as sodium, potassium or calcium chloride to elevated temperatures, the chloride and nitric acid may be reacted to produce a nitrate such as sodium, potassium, or calcium nitrate and a mixture of nitrosyl chloride and chlorine. It is known to carry out this reaction by a procedure in which the mixture of acid and chloride is introduced into a reaction vessel or column through which it flows downwardly in countercurrent contact with the evolved gases which pass upwardly towards the top of the vessel. It is known to supply the heat required for heating the reaction mixture to the requisite high temperatures by evaporating nitric acid in a boiler and passing the resulting hot nitric acid vapors into the bottom of the reaction vessel or column and thence upwardly in contact with the reaction mixture descending therethrough.

It is an object of this invention to provide a process for thus reacting nitric acid and a metal chloride whereby a greater efficiency in supplying the necessary heat to the reaction mixture and in utilizing the acid supplied to the process is obtained and, further, one in which the corrosion problem involved in the treatment of the nitric acid solutions may be greatly simplified.

In order to accomplish these objectives the process of this invention comprises heating an aqueous nitric acid to only partially evaporate the acid. The partially evaporated acid is then mixed with a metal chloride and introduced to the top of a reaction vessel down which it flows in countercurrent and direct contact with the aqueous vapors evolved by the precedent partial evaporation of the nitric acid. By supplying to the process nitric acid of a concentration of 40% to 65% HNO₃ in amounts in excess of that required for reaction with the metal chloride in accordance with the equation

$$4HNO_3 + 3MeCl = 3MeNO_3 + NOCl + Cl_2 + 2H_2O$$

The heat required to heat the nitric acid-chloride reaction mixture up to temperatures of 100° C. or above, preferably up to the boiling point of the reaction mixture itself, may be supplied while evaporating only 50% or less by weight of the total nitric acid supplied for reaction with the metal chloride. The remaining 50% or more of this acid which is not vaporized is then incorporated in the reaction mixture of nitric acid and metal chloride supplied to the top of the reaction vessel or column.

By only partially evaporating the acid to supply the heating vapors for the reaction mixture, the temperature of evaporation of the acid is materially lower than if the acid to be used for generating these heating vapors is completely evaporated. As a result of boiling off the vapors at a lower temperature, the efficiency of transferring heat to the evaporating acid and thence to the reaction mixture is increased.

By employing the process of this invention the corrosion of the metal boiler used for providing the heating vapors is minimized. It is known that chrome-iron alloys have a high resistance towards corrosion by hot aqueous nitric acid. It is, accordingly, preferred to employ such alloys for the construction of the evaporator or boiler in which the nitric acid is boiled in carrying out the process of this invention. In evaporating nitric acid in contact with chrome-iron surfaces there is, however, some corrosion of the metal to form corrosion products which are introduced into the acid. I have found that as these corrosion products accumulate in the acid, they increase the corrosiveness of the acid toward the chrome-iron alloys. Accordingly, in a procedure in which nitric acid is continuously supplied to an evaporator and is completely vaporized, the boiling acid in the evaporator soon has a marked increase in corrosiveness towards the evaporator surfaces due to the accumulation in the acid of the products of corrosion. This corrosiveness of the acid is aggravated by the fact that the solution in the evaporator will contain a relatively high concentration of nitric acid (about 69% HNO₃) irrespective of the concentration of acid supplied to the boiler. I have found that by only partially evaporating the acid, as is done in carrying out the process of this invention, and drawing from the boiler as liquid at least 5% of the acid introduced, the withdrawn liquid flushes the corrosion products from the boiler in amount sufficient to prevent undue corrosion of the chrome-iron alloys of which the boiler is constructed.

Finally, I have discovered that by partially evaporating nitric acid to provide the requisite quantity of heating vapors for the reaction mixture and then mixing the unevaporated residue with metal chloride to form the reaction mixture which is passed in countercurrent to the heating vapors, better utilization of the acid supplied to the process for reaction with the metal chloride is obtained than by a process in which a part of that acid is completely evaporated to provide the necessary heating vapors and the remainder, without being partially evaporated as in the process of this invention, is mixed with the metal chloride to form the reaction mixture treated with the heating vapors. By vaporizing the requisite quantity of heating vapors from a larger quantity of acid containing initially below 69% $HNO_3$ supplied to the process, the vapors introduced into contact with the reaction mixture in the bottom of the reaction vessel or column will contain a higher proportion of water to nitric acid than the vapors formed when a part of this acid is completely vaporized. As a result, a smaller proportion of the nitric acid supplied to the process is introduced in the heating vapors at the bottom of the reaction vessel and a larger proportion as a more concentrated nitric acid is introduced with the reaction mixture supplied to the top of the reaction vessel. I have discovered that the acid introduced with the reaction mixture to the top of the vessel is more effectively utilized in the decomposition of the metal chloride than that introduced with the heating vapors to the bottom of the reaction vessel. This better utilization of the nitric acid may serve in either of two ways: (1) with the process being operated to decompose a given percentage of the metal chloride, a smaller quantity of nitric acid will accomplish this purpose or (2) with given proportions of nitric acid and metal chloride supplied to the reaction mixture, the amount of residual undecomposed chloride is reduced.

The invention will be more fully illustrated by the following example of a process carried out in accordance therewith. The process of this example is illustrated in the accompanying drawing.

In the drawing the numeral 1 indicates a reaction vessel or column, to the top of which a slurry of sodium chloride in nitric acid is introduced and through which this reaction mixture passes downwardly in contact with hot vapors of water and nitric acid which are introduced to the bottom of column 1. These water-nitric acid vapors are generated by partially evaporating nitric acid supplied to a boiler 2 from which the unevaporated residue of nitric acid is passed to a slurry mixer 3 where it is mixed with solid sodium chloride to form the reaction mixture introduced to the top of reaction column 1.

In carrying out the process of this example, 100 parts per minute of 50% nitric acid are introduced into boiler 2 and partially evaporated to vaporize a mixture of water and nitric acid vapors containing about 85% of water and 15% of nitric acid by volume (corresponding to about 62% water and 38% $HNO_3$ by weight).

The hot nitric acid left from the partial evaporation of the acid supplied to boiler 2 flows to slurry mixer 3 where it is mixed with solid NaCl supplied at a rate of about 31 parts per minute. The reaction mixture thus obtained is passed into the top of reaction vessel 1 where it is contacted in countercurrent flow with the vapors from boiler 2. The rate of heating the acid in boiler 2 is such as to maintain a temperature of about 80° C. in the vapors leaving the top of reaction column 1. These vapors principally consist of nitrosyl chloride and chlorine evolved by reaction of the nitric acid and sodium chloride saturated with water vapor in contact with the aqueous reaction mixture at the temperature prevailing in the top of the reaction column. In mixing the nitric acid and sodium chloride in slurry mixer 3 some nitrosyl chloride-chlorine vapors are evolved and these vapors with those drawn from the top of reaction column 1 are passed through a cooler 4, in which they are cooled to condense the water vapor accompanying the nitrosyl chloride-chlorine. The condensate formed in cooler 4 flows back to the top of reaction vessel 1 with the reaction mixture introduced thereinto from slurry mixer 3. The dried nitrosyl chloride-chlorine mixture is drawn from cooler 4 and treated in any desired manner. A solution of sodium nitrate is drawn from the bottom of reaction vessel 1 and treated to recover solid sodium nitrate from it.

The procedure described in the above example may be modified in numerous ways without departing from the scope of this invention. All of the nitric acid supplied to the process for reaction with the metal chloride need not be evaporated in boiler 2. For example, a portion of the nitric acid may be cooled and directly contacted in cooler 4 with the nitrosyl chloride-chlorine gas to condense water vapor and dry the gas. The acid thus used for cooling the gas may be introduced into slurry mixer 3 or passed directly into the top of reaction vessel 1. In carrying out the invention, however, there is always supplied to boiler 2 a large enough portion of the acid introduced to the process so that by partial evaporation of the acid, withdrawing an unevaporated residue and incorporating this residue in the reaction mixture, the acid introduced to the top of the reaction column with the metal chloride contains a higher ratio of $HNO_3$ to $H_2O$ than the vapors of nitric acid and water introduced to the bottom of the column for heating the reaction mixture. A relatively high utilization of the total acid supplied is thus obtained. Further, by supplying to boiler 2 sufficient of the acid so that at least 5% of that introduced to the boiler is withdrawn therefrom without its being vaporized, the products of corrosion of the chrome-iron alloys of which boiler 2 is constructed are prevented from accumulating in the boiler to a degree such as to increase unduly the rate of corrosion of these chrome-iron alloys by the solution being boiled.

I claim:

1. In a process in which an aqueous nitric acid of a concentration at which it is to be reacted with a metal chloride is mixed with the metal chloride and the reaction mixture thus obtained, containing the water present in said aqueous acid, is heated to temperatures promoting the reaction of the nitric acid and metal chloride to form a solution of metal nitrate in said water and to evolve the chlorine of the metal chloride as gaseous nitrosyl chloride and chlorine, that improvement which comprises boiling at least a portion of said nitric acid to evolve therefrom a mixture of water and nitric acid vapors, leaving a residue of more concentrated nitric acid, incorporating said residue in the aforesaid reaction mixture, and passing said vapors of water and nitric acid in direct contact with and in countercurrent flow with said reaction mixture, thereby supplying heat to the reaction mixture.

2. In a process in which an aqueous nitric acid of a concentration at which it is to be reacted with a metal chloride is mixed with the metal chloride and the reaction mixture thus obtained, containing the water present in said aqueous acid, is heated to temperatures promoting the reaction of the nitric acid and metal chloride to form a solution of metal nitrate in said water and evolve the chlorine of the metal chloride as gaseous nitrosyl chloride and chlorine, that improvement which comprises boiling at least a portion of said nitric acid in a boiler constructed of a chrome-iron alloy to evolve therefrom a mixture of water and nitric acid vapors, leaving at least 5% of said portion of the aqueous acid as an unvaporized residue, withdrawing said residue from the boiler, incorporating the withdrawn residue in the aforesaid reaction mixture, and passing said vapors of water and nitric acid in direct contact with and in countercurrent flow with said reaction mixture, thereby supplying heat to the reaction mixture.

3. In a process in which an aqueous nitric acid of a concentration of 40% to 65% $HNO_3$ at which it is to be reacted with a metal chloride is mixed with the metal chloride and the reaction mixture thus obtained, containing the water present in said aqueous acid, is heated to temperatures promoting the reaction of the nitric acid and metal chloride to form a solution of metal nitrate in said water and to evolve the chlorine of said metal chloride as gaseous nitrosyl chloride and chlorine, that improvement which comprises boiling said nitric acid, thereby evaporating about 50% or less (by weight) of the aqueous acid, evolving therefrom a mixture of water and nitric acid vapors and leaving a residue of more concentrated nitric acid, incorporating said residue in the aforesaid reaction mixture and passing said vapors of water and nitric acid in direct contact with and in countercurrent flow with said reaction mixture, thereby supplying heat to the reaction mixture.

4. In a process in which an aqueous nitric acid of a concentration of 40% to 65% $HNO_3$ at which it is to be reacted with a metal chloride is mixed with the metal chloride and the reaction mixture thus obtained, containing the water present in said aqueous acid, is heated to progressively higher temperatures to cause reaction of the nitric acid and metal chloride to form a solution of metal nitrate in substantially all the water contained in said aqueous acid, and to evolve the chlorine of said metal chloride as gaseous nitrosyl chloride and chlorine which are withdrawn as a substantially dry gaseous product of the reaction, that improvement which comprises boiling said nitric acid to evolve therefrom a mixture of water and nitric acid vapors, leaving a residue of more concentrated nitric acid, incorporating said residue in the aforesaid reaction mixture, and passing said vapors of water and nitric acid in direct contact with and in countercurrent flow with said reaction mixture, thereby condensing said vapors and incorporating the water and nitric acid contained therein in said reaction mixture and transferring heat contained in the vapors to the reaction mixture.

5. In a process in which an aqueous nitric acid of a concentration at which it is to be reacted with a metal chloride is mixed with the metal chloride, the reaction mixture thus obtained, containing the water present in said aqueous acid, is heated to temperatures promoting the reaction of the nitric acid and metal chloride to form a solution of metal nitrate and to evolve the chlorine of said metal chloride as gaseous nitrosyl chloride and chlorine, and substantially all the water vapor in the gaseous nitrosyl chloride and chlorine leaving contact with the reaction mixture is condensed and returned to the reaction mixture and withdrawn in said solution of metal nitrate, that improvement which comprises boiling at least a part of said nitric acid to evaporate about 50% or less (by weight) of the aqueous acid and to evolve therefrom a mixture of water and nitric acid vapors, leaving a residue of more concentrated nitric acid, incorporating said residue in the aforesaid reaction mixture and passing said vapors of water and nitric acid in direct contact with and in countercurrent flow with said reaction mixture, thereby supplying heat to the reaction mixture.

6. In a process in which an aqueous nitric acid of a concentration at which it is to be reacted with a metal chloride is mixed with the metal chloride and the reaction mixture thus obtained, containing the water present in said aqueous acid, is heated to temperatures promoting the reaction of the nitric acid and metal chloride to form a solution of metal nitrate in said water and to evolve the chlorine of the metal chloride as gaseous nitrosyl chloride and chlorine, that improvement which comprises dividing said aqueous acid into at least two portions boiling one of said portions of acid to evolve therefrom a mixture of water and nitric acid vapors, leaving a residue of more concentrated nitric acid, incorporating said residue in the aforesaid reaction mixture, passing said vapors of water and nitric acid in direct contact with and in countercurrent flow with said reaction mixture, thereby supplying heat to the reaction mixture, cooling another portion of the aforesaid aqueous nitric acid, passing the cooled portion of acid in contact with the nitrosyl chloride-chlorine gas evolved from the reaction mixture to condense and remove water vapor therefrom and thereafter incorporating the last mentioned portion of acid, containing the water vapor removed from the nitrosyl chloride-chlorine gas, in said reaction mixture.

HERMAN A. BEEKHUIS, Jr.